United States Patent
Ogawa et al.

(10) Patent No.: US 7,073,169 B2
(45) Date of Patent: Jul. 4, 2006

(54) COMPILER DEVICE WITH BRANCH INSTRUCTION INSERTING UNIT

(75) Inventors: Hajime Ogawa, Kyoto (JP); Shuichi Takayama, Takarazuka (JP); Taketo Heishi, Osaka (JP); Nobuo Higaki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 670 days.

(21) Appl. No.: 10/174,108

(22) Filed: Jun. 17, 2002

(65) Prior Publication Data

US 2002/0199177 A1    Dec. 26, 2002

(30) Foreign Application Priority Data

Jun. 22, 2001 (JP) .............................. 2001-189917

(51) Int. Cl.
*G06F 9/45* (2006.01)
(52) U.S. Cl. ...................................... 717/161
(58) Field of Classification Search ........ 717/141–144, 717/149–161; 712/23–24, 213–218, 233–241
See application file for complete search history.

(56) References Cited

U.S. PATENT DOCUMENTS

| | | | | |
|---|---|---|---|---|
| 5,151,991 | A * | 9/1992 | Iwasawa et al. ............. | 717/150 |
| 5,764,951 | A * | 6/1998 | Ly et al. ......................... | 716/1 |
| 5,815,719 | A * | 9/1998 | Goebel ........................ | 717/158 |
| 5,930,510 | A * | 7/1999 | Beylin et al. ................ | 717/161 |
| 6,016,399 | A * | 1/2000 | Chang ......................... | 717/160 |
| 6,026,240 | A * | 2/2000 | Subramanian ............... | 717/161 |
| 6,192,515 | B1 | 2/2001 | Doshi et al. | |
| 6,230,317 | B1 * | 5/2001 | Wu ............................. | 717/161 |
| 6,634,024 | B1 * | 10/2003 | Tirumalai et al. ........... | 717/161 |
| 2002/0087851 | A1 * | 7/2002 | Yoshioka .................... | 712/239 |
| 2002/0112228 | A1 * | 8/2002 | Granston et al. ........... | 717/155 |
| 2002/0124159 | A1 * | 9/2002 | Bekooji et al. ............. | 712/226 |
| 2003/0023838 | A1 * | 1/2003 | Karim et al. ................ | 712/235 |

OTHER PUBLICATIONS

Lam, M. S., Software pipelining: A effective scheduling techinque for VLIW machines, Jun. 1988, Proceedings of the ACM SIGPLAN 1988 Conference on Programming Language Design and Implementation, pp. 318-328.*

"Complilers: Structure and Optimization" Sep. 1999, authored by Ikuo Nakata, published by Asakura-shoten, pp. 373-376.

* cited by examiner

*Primary Examiner*—Kakali Chaki
*Assistant Examiner*—Kou-Yi K. Chen
(74) *Attorney, Agent, or Firm*—Hamre, Schumann, Mueller & Larson, P.C.

(57) ABSTRACT

A compiler device includes a conditional-executable-instruction generation unit and a branch instruction insertion unit. The conditional-executable-instruction generation unit generates a conditional executable instruction that is executed when a condition that the conditional executable instruction refers to is satisfied. In the case where there is a section containing a non-executive condition under which no instruction is executed in one cycle or a plurality of cycles in series, the branch instruction insertion unit inserts a conditional branch instruction that refers to the non-executive condition and instructs to branch to a cycle immediately after a last cycle of the section, to after an instruction of a cycle immediately before a start of the section. Thus, a compiler device employing conditional executable instructions is provided that is capable of generating an assembler code that does not degrade the performance when the instructions are executed, even if a source program includes a branch instruction that causes a then part and an else part to be executed through unbalanced numbers of cycles, respectively.

13 Claims, 22 Drawing Sheets

FIG. 3

```
if (x > 0) {
        t = b + c;
        u = t - s;
        w = u + v;
        a = w - 1;
}
else {
        a = b - c;
}
```

FIG. 4

```
          cmple   R5, 0, C0        ...501
  [C0]    bt      L1               ...502
          add     R1, R2, R0       ...503
          sub     R0, R3, R0       ...504
          add     R0, R4, R0       ...505
          sub     R0, 1, R0        ...506
          br      L2               ...507
L1:
          sub     R1, R2, R0       ...508
L2:
          ...
```

FIG. 5

```
          cmpgt   R5, 0, C0:C1     ...509
  [C0]    add     R1, R2, R0       ...510
  [C1]    sub     R1, R2, R0       ...511
  [C0]    sub     R0, R3, R0       ...512
  [C0]    add     R0, R4, R0       ...513
  [C0]    sub     R0, 1, R0        ...514
          ...
```

FIG. 6

|       | cmpgt | R5, 0, C0:C1 | ...515 |
|-------|-------|--------------|--------|
|       | E     |              |        |
| [C0]  | add   | R1, R2, R0   | ...516 |
| [C1]  | sub   | R1, R2, R0   | ...517 |
|       | E     |              |        |
| [C0]  | sub   | R0, R3, R0   | ...518 |
|       | E     |              |        |
| [C0]  | add   | R0, R4, R0   | ...519 |
|       | E     |              |        |
| [C0]  | sub   | R0, 1, R0    | ...520 |
|       | E     |              |        |
|       | ...   |              |        |

FIG. 7

|       | cmpgt | R5, 0, C0:C1 | ...521 |
|-------|-------|--------------|--------|
|       | E     |              |        |
| [C0]  | add   | R1, R2, R0   | ...522 |
| [C1]  | sub   | R1, R2, R0   | ...523 |
| [C1]  | br    | L1           | ...524 |
|       | E     |              |        |
| [C0]  | sub   | R0, R3, R0   | ...525 |
|       | E     |              |        |
| [C0]  | add   | R0, R4, R0   | ...526 |
|       | E     |              |        |
| [C0]  | sub   | R0, 1, R0    | ...527 |
|       | E     |              |        |
| L1:   |       |              |        |
|       | ...   |              |        |

```
for (i = 0; i < 100; i++) { if (x[i] > 0) {
            c[i] = a[i] + b[i] + c[i];
    }
    else {
            c[i] = 0;
    }
}
```

```
Loop:
        ld      (R10),R20           ...901
        cmple   R20, 0, C0          ...902
[C0]    br      L1                  ...903
        ld      (R11),R21           ...904
        ld      (R12),R22           ...905
        ld      (R13),R24           ...906
        add     R21,R22,R23         ...907
        add     R23,R24,R25         ...908
        br      L2                  ...909
L1:
        mov     0,R25               ...910
L2:
        st      R25,(R13)           ...911
        add     R10,4,R10           ...912
        add     R11,4,R11           ...913
        add     R12,4,R12           ...914
        add     R13,4,R13           ...915
        cmplt   R10,a+400,C1        ...916
[C1]    br      Loop                ...917
```

FIG. 13

```
Loop:
        ld      (R10),R20           ...918
        cmpgt   R20, 0, C0:C1       ...919
[C0]    ld      (R11),R21           ...920
[C0]    ld      (R12),R22           ...921
[C0]    ld      (R13),R24           ...922
[C0]    add     R21,R22,R23         ...923
[C0]    add     R23,R24,R25         ...924
[C1]    mov     0,R25               ...925
        st      R25,(R13)           ...926
        add     R10,4,R10           ...927
        add     R11,4,R11           ...928
        add     R12,4,R12           ...929
        add     R13,4,R13           ...930
        cmplt   R10,a+400,C2        ...931
[C2]    br      Loop                ...932
```

FIG. 14

```
Loop:
        add     R11,4,R11       ; 1     ...933
        ld      (R10),R20       ; 2     ...934
        add     R10,4,R10       ; 2     ...935
        E
        st      R25,(R13)       ; 1     ...937
        add     R12,4,R12       ; 1     ...936
        cmpgt   R20, 0, C0:C1   ; 2     ...938
        cmplt   R10,a+400,C2    ; 2     ...939
        E
        add     R13,4,R13       ; 1     ...940
[C1]    mov     0,R25           ; 2     ...941
        E
```

FIG. 15

```
Loop:
[C0]    add     R23,R24,R25     ; 1     ...942
        add     R11,4,R11       ; 1     ...943
        ld      (R10),R20       ; 2     ...944
        add     R10,4,R10       ; 2     ...945
        E
        st      R25,(R13)       ; 1     ...946
        add     R12,4,R12       ; 1     ...947
        cmpgt   R20, 0, C0:C1   ; 2     ...948
        cmplt   R10,a+400,C2    ; 2     ...949
        E
        add     R13,4,R13       ; 1     ...950
[C1]    mov     0,R25           ; 1     ...951
[C0]    ld      (R11),R21       ; 2     ...952
        E
[C0]    ld      (R12),R22       ; 2     ...953
        E
[C0]    ld      (R13),R24       ; 2     ...954
[C0]    add     R21,R22,R23     ; 2     ...955
[C2]    br      Loop            ; 2     ...956
        E
```

```
Loop:
[C0]      add       R23,R24,R25      ; 1    ...957
[C1]      mov       0,R25            ; 1    ...958
          ld        (R10),R20        ; 2    ...959
          add       R10,4,R10        ; 2    ...960
          E
          st        R25,(R13)        ; 1    ...961
          cmpgt     R20, 0, C0:C1    ; 2    ...962
          add       R11,4,R11        ; 1    ...963
          cmplt     R10,a+400,C2     ; 2    ...964
          E
[C0]      ld        (R11),R21        ; 2    ...965
          add       R12,4,R12        ; 1    ...966
          add       R13,4,R13        ; 1    ...967
[C1&C2]   br        Loop                    ...968
          E
[C0]      ld        (R12),R22        ; 2    ...969
          E
[C0]      ld        (R13),R24        ; 2    ...970
[C0]      add       R21,R22,R23      ; 2    ...971
[C2]      br        Loop             ; 2    ...972
          E
```

FIG. 16

|  |  |  |  |
|---|---|---|---|
|  | cmpeq<br>E | R0,0,C0:C1 | ...1101 |
| [C0] | inst1 |  | ...1102 |
| [C0] | inst2 |  | ...1103 |
| [C0] | inst3 |  | ...1104 |
| [C0] | inst4 |  | ...1105 |
| [C1] | inst5 |  | ...1106 |
| [C1] | inst6 |  | ...1107 |
| [C1] | inst7 |  | ...1108 |
| [C1] | inst8<br>E |  | ...1109 |

```
for (i = 0; i < 100; i++) {
        if (x[i] > 0) {
                y[i] = (a[i] + b[i] + c[i]) * 2;
        }
        else {
                y[i] = 0;
        }
}
```

FIG. 22

```
Loop:
        ld      (R10),R20               ...1301
        cmpgt   R20, 0, C0:C1           ...1302
[C0]    ld      (R11),R21
[C0]    ld      (R12),R22
[C0]    ld      (R13),R24
[C0]    add     R21,R22,R23
[C0]    add     R23,R24,R25
[C0]    asl     R25,1,R25
[C1]    mov     0,R25
        st      R25,(R14)               ...1303
        add     R10,4,R10               ...1304
        add     R11,4,R11               ...1305
        add     R12,4,R12               ...1306
        add     R13,4,R13               ...1307
        add     R14,4,R14               ...1308
        cmplt   R10,a+400,C2            ...1309
[C2]    br      Loop
```

```
Loop:
        ld      (R10),R20
        cmpgt   R20, 0, C0:C1
        add     R10,4,R10
        cmplt   R10,a+400,C2
[C0]    ld      (R11),R21
[C0]    ld      (R12),R22
[C0]    ld      (R13),R24
[C0]    add     R21,R22,R23
[C0]    add     R23,R24,R25
[C0]    asl     R25,1,R25
[C0]    st      R25,(R14)           ...1401
[C0]    add     R11,4,R11           ...1402
[C0]    add     R12,4,R12
[C0]    add     R13,4,R13
[C0]    add     R14,4,R14           ...1403
[C0]    cmplt   R10,a+400,C2
[C1]    mov     0,R25
[C1]    st      R25,(R14)           ...1404
[C1]    add     R11,4,R11           ...1405
[C1]    add     R12,4,R12
[C1]    add     R13,4,R13
[C1]    add     R14,4,R14           ...1406
[C2]    br      Loop
```

```
            ld      (R10),R20          ; 2
            add     R10,4,R10          ; 2
            E
    [C0']   ld      (R13),R24          ; 1
    [C0']   add     R13,4,R13          ; 1
            cmpgt   R20, 0, C0:C1      ; 2
            cmplt   R10,a+400,C2       ; 1
            E
    [C0']   add     R23,R24,R25        ; 1
    [C0]    ld      (R11),R21          ; 2
    [C0]    add     R11,4,R11          ; 2             ...1408
            E
    [C0']   asl     R25,1,R25          ; 1
    [C0]    ld      (R12),R22          ; 2
    [C0]    add     R12,4,R12          ; 2
            E
    [C0']   st      R25,(R14)          ; 1
    [C0']   add     R14,4,R14          ; 1
    [C0]    add     R21,R22,R23        ; 2
    [C2]    lbr     Loop                               ...1420
            E
```

FIG. 25

```
    [C1']   add     R13,4,R13          ; 1
            ld      (R10),R20          ; 2
            add     R10,4,R10          ; 2
            E
    [C1']   st      R25,(R14)          ; 1
    [C1']   add     R14,4,R14          ; 1
            cmpgt   R20, 0, C0:C1      ; 2
            cmplt   R10,a+400,C2       ; 2
            E
    [C1]    mov     0,R25              ; 2
    [C1]    add     R11,4,R11          ; 2             ...1409
    [C1]    add     R12,4,R12          ; 2
    [C2]    lbr     Loop                               ...1421
            E
```

```
          ld      (R10),R20       ; 2
          add     R10,4,R10       ; 2
[C1']     add     R13,4,R13       ; 1
          E
[C0']     ld      (R13),R24       ; 1
[C0']     add     R13,4,R13       ; 1
[C1']     st      R25,(R14)       ; 1
[C1']     add     R14,4,R14       ; 1
          cmpgt   R20, 0, C0:C1   ; 2
          cmplt   R10,a+400,C2    ; 2
          E
[C0']     add     R23,R24,R25     ; 1
[C0]      ld      (R11),R21       ; 2
          add     R11,4,R11       ; 2      ...1410
[C1]      mov     0,R25           ; 2
[C1]      add     R12,4,R12       ; 2
          E
[C0']     asl     R25,1,R25       ; 1      ...1411
[C0]      ld      (R12),R22       ; 2
[C0]      add     R12,4,R12       ; 2
          E
[C0']     st      R25,(R14)       ; 1
[C0']     add     R14,4,R14       ; 1
[C0]      add     R21,R22,R23     ; 2      ...1412
[C2]      lbr     Loop
          E
```

FIG. 26

```
              ld        (R10),R20        ; 2
              add       R10,4,R10        ; 2
    [C1']     add       R13,4,R13        ; 1
              E
    [C0']     ld        (R13),R24        ; 1
    [C0']     add       R13,4,R13        ; 1
    [C1']     st        R25,(R14)        ; 1
    [C1']     add       R14,4,R14        ; 1
              cmpgt     R20, 0, C0:C1    ; 2
              cmplt     R10,a+400,C2     ; 2
              E
    [C0']     add       R23,R24,R25      ; 1
    [C0]      ld        (R11),R21        ; 2
              add       R11,4,R11        ; 2
    [C1]      mov       0,R25            ; 2
    [C1]      add       R12,4,R12        ; 2
    [C1&C1'&C2] lbr     Loop                       ...1413
              E
    [C0']     asl       R25,1,R25        ; 1       ...1414
    [C0]      ld        (R12),R22        ; 2
    [C0]      add       R12,4,R12        ; 2
              E
    [C0']     st        R25,(R14)        ; 1
    [C0']     add       R14,4,R14        ; 1       ...1415
    [C0]      add       R21,R22,R23      ; 2       ...1416
    [C2]      lbr       Loop
              E
```

```
if (x > 0) {
        a = b + c;
}
else {
        a = b - c;
}
...
```

FIG. 28B

```
        cmple   R5, 0              ...101
        bt      L1                 ...102
        add     R1, R2, R0         ...103
        br      L2                 ...104
L1:
        sub     R1, R2, R0         ...105
L2:
        ...
```

FIG. 28C

```
        cmpgt   R5, 0, C0:C1       ...106
[C0]    add     R1, R2, R0         ...107
[C1]    sub     R1, R2, R0         ...108
        ...
```

FIG. 29

```
if (x > 0) {
        t = b + c;
        u = t - s;
        w = u + v;
        a = w - 1;
}
else {
        a = b - c;
}
```

FIG. 30

```
         cmpgt   R5, 0, C0:C1    ...201
[C0]     add     R1, R2, R0      ...202
[C1]     sub     R1, R2, R0      ...203
[C0]     sub     R0, R3, R0      ...204
[C0]     add     R0, R4, R0      ...205
[C0]     sub     R0, 1, R0       ...206
         ...
```

FIG. 31

```
         cmple   R5, 0, C0       ...207
[C0]     bt      L1              ...208
         add     R1, R2, R0      ...209
         sub     R0, R3, R0      ...210
         add     R0, R4, R0      ...211
         sub     R0, 1, R0       ...212
         br      L2              ...213
L1:
         sub     R1, R2, R0      ...214
L2:      ...
```

COMPILER DEVICE WITH BRANCH INSTRUCTION INSERTING UNIT

BACKGROUND OF THE INVENTION

1. Field of the Invention

The present invention relates generally to a compiler device for a processor having conditional executable instructions, and particularly to a compiler device that executes software pipelining utilizing conditional executable instructions.

2. Related Background Art

Recently, processors capable of parallel processing so as to implement higher-speed processing have increased, and some include, in their instruction specification, conditional executable instructions that are executed when conditions referred to are met, as one of the techniques for improving the effects of the parallel processing. It is advantageous to utilize such instructions since penalties generated when branch instructions are executed, as well as the branch instructions per se, can be omitted.

For instance, when a C language program shown in FIG. 28A is compiled without employing any conditional executable instructions, an assembler code as shown in FIG. 28B is obtained. With an instruction 101, whether the condition (R5≦0) is met is determined, and if the condition is met, the instruction 102 causes branching to be executed. With a latency for each instruction being one cycle, in the case where the else part (a branch thereto is established at the instruction 102) is executed, the instructions 101, 102, and 105, each of which requires one cycle, are executed, and therefore three cycles are needed in this case. In the case where the then part also is executed, three cycles are needed likewise, since instructions 103 and 104 are executed in parallel. Furthermore, if penalties occur due to branch prediction failures, more cycles are needed.

On the other hand, in the case where the foregoing program is compiled employing conditional executable instructions, an assembler code as shown in FIG. 28(c) is obtained. An instruction 106 causes the result of the condition determination to be written in a flag C0 or C1. In the present case, if R5>0, C0=1 and C1=0, whereas if R5≦0, C0=0 and C1=1. Instructions 107 and 108 are set so that each is executed when a flag referred to is 1, whereas it is not executed when the flag is not 1. For instance, as to the instruction 107, this "add" instruction is executed exclusively when the flag C0 is 1.

In the foregoing example, as described above, 1 is written in only one of C0 and C1 in the execution of the instruction 106, and hence, the instructions 107 and 108 can be processed in parallel. Therefore, irrespective of the execution of the then part or the else part, it requires only two cycles, and no branch instruction exists, thereby resulting in no branch prediction error penalty. Therefore, the assembler code obtained by the compiling that employs conditional executable instructions is superior in both of the performance and the code size.

Furthermore, software pipelining is available as one of techniques for loop optimization of a compiler device, which also has an advantage achieved by employing conditional executable instructions.

In the case where a loop has a branch, the software pipelining may be performed in a state in which the branch exists, by employing a technique such as the hierarchical contraction (see "Konpaira no kousei to saitekika" ("Compilers: Structure and Optimization"), Asakura-shoten, p. 374), but in many cases, conditional branch instructions preferably are used, so as to make an algorithm simpler and more effective.

However, when a program is compiled employing conditional executable instructions, if it is not balanced between the then part and the else part in terms of the number of the execute cycles, the performance tends to deteriorate in some cases as compared with the case where the conditional executable instructions are not employed.

For instance, as shown in FIG. 29, the C language program in which the then part and the else part differ significantly from each other in the number of the operations to be executed is compiled employing conditional executable instructions, an assembler code as shown in FIG. 30 is obtained. This assembler code is not balanced, either, since C0 is referred to by four conditional executable instructions, while C1 is referred to by one conditional executable instruction.

Since respective flags that instructions 202 and 203 shown in FIG. 30 refer to have exclusivity, only either one of the instructions is executed, and hence, the instructions 202 and 203 can be processed in parallel. The execution of the then part requires five execute cycles, whereas the execution of the else part also requires the same number, five, of execute cycles even though only the instructions 201 and 203 are executed.

If the C language program shown in FIG. 29 is compiled, not by employing the condition execution instructions, but by employing branch instructions, an assembler code shown in FIG. 31 is obtained. Here, assuming that no branch penalty is generated, the execution of the else part can be completed with only three cycles for the executions of the instructions 207, 208, and 214.

In other words, in the case where conditional executable instructions are used, the performance is constrained by the part requiring the greater number of execute cycles. Therefore, in the case where the program is unbalanced between the then part and the else part in terms of the number of executed instructions, the use of conditional executable instructions impairs the execution performance when the part having fewer instructions to be executed is carried out.

Likewise, in the case where software pipelining is carried out employing conditional executable instructions, a start interval indicative of the number of cycles needed for one iteration is constrained by the part requiring the greater number of execute cycles. Therefore, in the case where a program is unbalanced between the then part and the else part in terms of the number of instructions to be executed, a loop that is not subjected to software pipelining and does not employ conditional executable instructions exhibits better execution performance when a part having fewer executive instructions is executed, as compared with a loop configured otherwise.

SUMMARY OF THE INVENTION

Therefore, with the foregoing in mind, it is an object of the present invention to provide a compiler device that employs conditional executable instructions so as to generate a series of instructions that do not degrade the execution performance even when either a then part or an else part that has the smaller number of instructions is executed.

To achieve the foregoing object, a compiler device according to the present invention includes a conditional-executable-instruction generating means and a branch instruction inserting means. The conditional executable instruction generating means generates a conditional executable instruction that is executed when a condition that the conditional executable instruction refers to is satisfied. The branch instruction inserting means for, in the case where there is a section containing a non-executive condition under which no instruction is executed in one cycle or a plurality of cycles in series, inserts a conditional branch instruction to after an instruction of a cycle immediately before a start of the section, the branch instruction referring to the non-executive condition and instructing to branch to a cycle immediately after a last cycle of the section.

With this, a compiler device can be provided that produces an assembler code that is optimized so as to be executed with the minimum number of cycles, when, among two branched paths, the shorter path is executed, without being restricted by an execution time of the longer path. This makes it possible to avoid the performance degradation that could be incurred with an execute form program obtained from the assembler code.

The compiler device further may include a software pipelining means for scheduling instructions so that different iterations of loops can be overlapped when they are executed, and in the case where there is a section in which no instruction is present other than instructions that are to be executed only in a last iteration, which contains a non-executive condition under which no instruction is executed, and which continues in one cycle or a plurality of cycles in series to an end of a loop, the branch-instruction inserting means may insert a conditional branch instruction into a cycle immediately before a start of the section, the conditional branch instruction referring to the non-executive condition and instructing to branch to a cycle at a top of the loop.

Furthermore, the compiler device may be configured so that, in the case where any non-executive condition under which no instruction is executed is present in each iteration and there is a section in which the non-executive conditions are present in all the iterations and which continues in one cycle or a plurality of cycles in series to an end of a loop, the branch instruction inserting means inserts a conditional branch instruction into a cycle immediately before a start of the section, the conditional branch instruction referring to a logical product of the non-executive conditions of each iteration and instructing to branch to a cycle at a top of the loop.

This makes it possible to avoid the performance degradation incurred by the conversion into conditional executable instructions, in the case where software pipelining is applied.

Here, the compiler device may be configured so that the software pipelining means selects unit conditions that are a plurality of conditions such that a logical sum of all the conditions is true always, divides each of instructions that are executed referring to a logical sum of a plurality of, or all of, the unit conditions into a plurality of conditional executable instructions that refer to the unit conditions, schedules, as to each of the unit conditions, instructions that refer to the unit condition so that different iterations of loops can be overlapped when they are executed, and combines the series of instructions that have been scheduled as to each of the unit conditions.

Furthermore, the compiler device may be configured so that the software pipelining means selects unit conditions that are a plurality of conditions such that a logical sum of all the conditions is true always, and as to each of the unit conditions, in an ascendant order of execution times for unit conditions, the execution time being a time required for executing conditional instructions that are a series of instructions that refer to either the unit condition or a condition containing the unit condition, the software pipelining means schedules the conditional instructions, with scheduled positions of already-scheduled instructions being fixed, so that different iterations of loops can be overlapped when they are executed.

This allows the effect obtained by the insertion of branch instructions to improve further.

Here, the compiler device may be configured so that the software pipelining means selects unit conditions that are a plurality of conditions such that a logical sum of all the conditions is true always, and as to each of the unit conditions, in a descendent order of execution frequencies of the unit conditions, the software pipelining means schedules conditional instructions that are a series of instructions that refer to either the unit condition or a condition containing the unit condition, with scheduled positions of already-scheduled instructions being fixed, so that different iterations of loops can be overlapped when they are executed.

This makes it possible to apply an optimization specific to a path with the higher frequency with respect to a branch structure with biased execution frequencies, thereby improving the performance.

Furthermore, to achieve the aforementioned object, a compile program according to the present invention, loaded in a computer, causes the computer to execute a conditional-executable-instruction generating process for generating a conditional executable instruction that is executed when a condition that the conditional executable instruction refers to is satisfied, and a branch instruction inserting process for, in the case where there is a section containing a non-executive condition under which no instruction is executed in one cycle or a plurality of cycles in series, inserting a conditional branch instruction to after an instruction of a cycle immediately before a start of the section, the branch instruction referring to the non-executive condition and instructing to branch to a cycle immediately after a last cycle of the section.

By causing a computer to load the compile program and to run the same, it is possible to cause the computer to implement a compiler device that produces an assembler code that is optimized so as to be executed with the minimum number of cycles, when, among two branched paths, the shorter path is executed, without being restricted by an execution time of the longer path. This makes it possible to avoid the performance degradation that could be incurred when an execute form program obtained from the assembler code.

BRIEF DESCRIPTION OF THE DRAWINGS

FIG. 3 is a program list illustrating one example of a C language program for explaining an operation of the compiler device.

FIG. 4 is a program list of a first intermediate code obtained by applying a general optimization operation to the C language program shown in FIG. 3.

FIG. 5 is a program list of a second intermediate code obtained by applying a conditional-executable-instruction generating operation to the first intermediate code shown in FIG. 4.

FIG. 6 is a program list of a third intermediate code obtained by applying a scheduling operation to the second intermediate code shown in FIG. 5.

FIG. 7 is a program list of an assembler code obtained by applying a branch-instruction inserting operation to the third intermediate code shown in FIG. 6

FIG. 11 is a program list illustrating an example of a C language program for explaining an operation of the compiler device according to the second embodiment.

FIG. 12 is a program list of a first intermediate code obtained by applying a general optimization operation to the C language program shown in FIG. 11.

FIG. 13 is a program list of a second intermediate code obtained by applying a conditional-executable-instruction generation operation to the first intermediate code shown in FIG. 12.

FIG. 14 is a program list of an intermediate code obtained by scheduling only instruction strings that are likely to be executed under a condition of R20≦0 in the second intermediate code shown in FIG. 13.

FIG. 15 is a program list of a third intermediate code obtained by further scheduling only a series of instructions that are likely to be executed under a condition of R20<0 in the intermediated code shown in FIG. 14.

FIG. 16 is a program list of an assembler code obtained by applying a branch-instruction inserting operation to the third intermediate code shown in FIG. 15.

FIG. 18 is a program list illustrating an example of an assembler code with respect to a target processor (processor having an instruction canceling mechanism) of a compiler device according to a third embodiment.

FIG. 21 is a program list illustrating an example of a C language program for explaining an operation of the compiler device of the third embodiment.

FIG. 22 is a program list of a second intermediate code obtained by applying a general optimization operation and a conditional-executable-instruction generating operation to the C language program shown in FIG. 21.

FIG. 23 is a program list of an intermediate code obtained by dividing conditional executable instructions that refer to a unit condition in the second intermediate code shown in FIG. 22.

FIG. 24 is a program list of an intermediate code obtained by scheduling instructions that refer to one of unit conditions in the intermediate code shown in FIG. 23.

FIG. 25 is a program list of an intermediate code obtained by scheduling instructions that refer to another unit condition in the intermediate code shown in FIG. 24.

FIG. 26 is a program list of an intermediate code obtained by combining the intermediate codes shown in FIGS. 24 and 25.

FIG. 27 is a program list of an assembler code obtained by inserting branch instructions in the intermediate code shown in FIG. 26.

FIGS. 28A to 28C are program lists for explaining operations of a conventional compiler device: FIG. 28A illustrates an example of a C language program supplied as a source code; FIG. 28B illustrates an assembler code obtained by compiling the C language program without employing conditional executable instructions with the conventional compiler device; and FIG. 28C illustrates an assembler code obtained by compiling the C language program by employing conditional executable instructions with the conventional compiler device.

FIG. 29 is a program list illustrating an example of a C language program that is not balanced well between the then part and the else part.

FIG. 30 is a program list of an assembler code obtained by compiling the C language program shown in FIG. 29 by employing conditional executable instructions with the conventional compiler device.

FIG. 31 is a program list of an assembler code obtained by compiling the C language program shown in FIG. 29 without employing conditional executable instructions with the conventional compiler device.

DETAILED DESCRIPTION OF THE INVENTION

Figure 1:
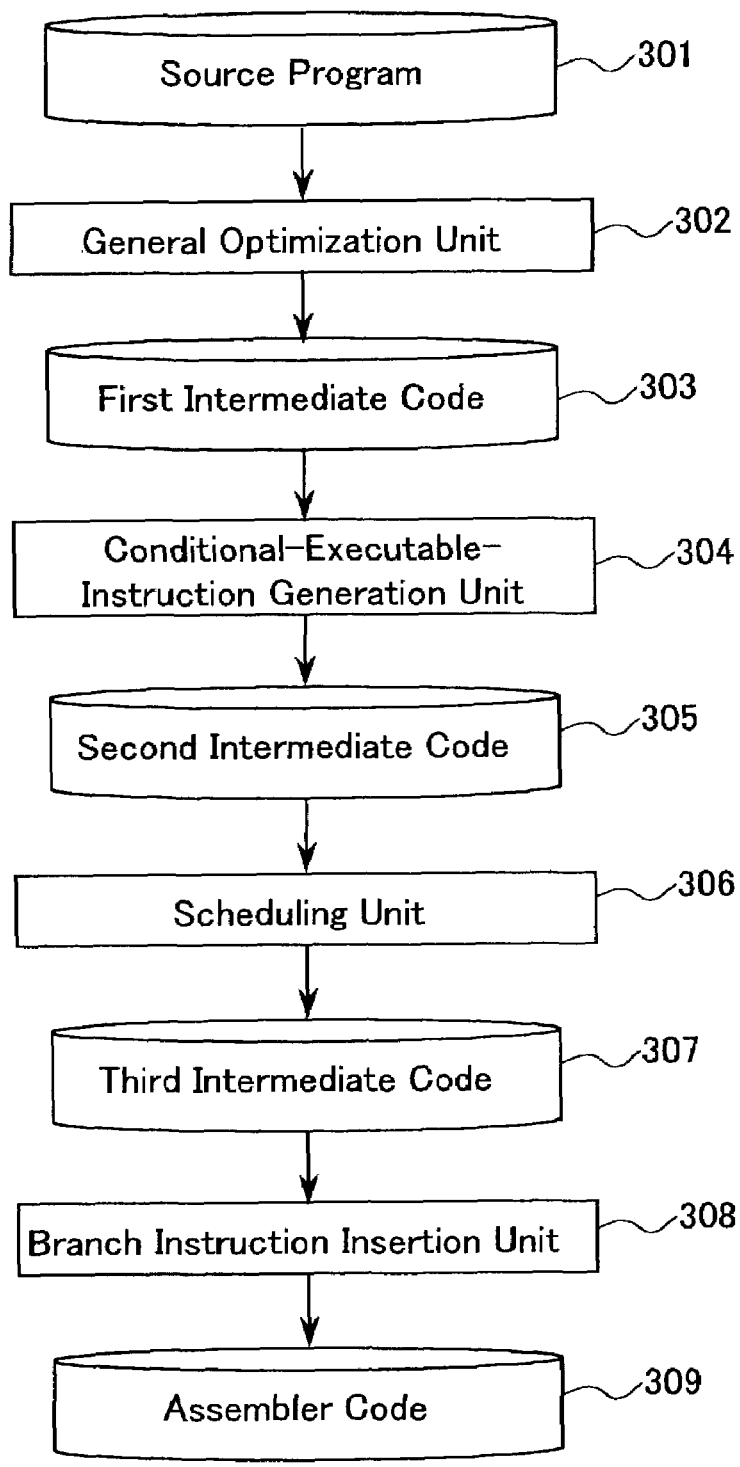
FIG. 1 is a block diagram illustrating a configuration of a compiler device according to a first embodiment of the present invention, along with input and output codes and intermediate codes.

The following will describe embodiments of a compiler device according to the present invention, while referring to the drawings.

First of all, the following will describe definitions of terms used herein.

"Start interval" is defined as an interval since an iteration is executed until a next iteration is executed in the case where instructions in a loop are subjected to software pipelining. This value as it is determines the execution performance of the loop.

"Parallel processing border" is indicated in a form of a line in which only "E" is described in an assembler code. In an assembler code, instructions interposed between one "E" and a next "E" are a group of instructions that can be processed in parallel concurrently.

"Entry cycle for a section" is defined as a cycle immediately before a cycle with which the section starts. "Exit cycle for a section" is defined as a cycle immediately after a cycle with which the section ends.

"Unit condition" indicates one element among a set of conditions such that a logical sum of all the conditions is true always. The unit condition can be selected arbitrarily by a compiler device, but normally a condition is used that is expressed in a state of being written in a conditional flag.

FIRST EMBODIMENT

The following will describe an embodiment of a compiler device according to the present invention.

It should be noted that a target processor of the present compiler device may be such that instructions used are variable or fixed in size, and may be a single-instruction-stream issuing type or a multiple-instruction-stream-issuing type. Besides, the target processor includes an instruction memory, a program counter, an instruction fetch circuit, an instruction register, an instruction decoder, an arithmetic unit, a general register, a data memory, and buses for the transfer of data and addresses.

A very-long-instruction-word (VLIW)-type processor that is of a three-operand designation type and capable of processing four instructions concurrently is employed as an example of a target processor in the present embodiment. A plurality of conditional flags are prepared, and each conditional executable instruction is allowed to specify a conditional flag that the instruction refers to. The writing in a conditional flag is carried out by a compare instruction, and the flag to be set can be specified.

Here, the following will describe principal instructions among the instruction set of the present processor.

"add R0, R1, R2" is an instruction for adding contents of a register R0 and a register R1, and writing the result in a register R2.

"st R1, (R2)" is an instruction for writing the content of the register R1 in an address of the register R2.

"cmpeq R3, R4, C0" is an instruction for writing 1 in a conditional flag C0 if the values of the registers R3 and R4 are equal, or writing 0 therein otherwise. "[C0] 1$d$ (R3), R4" indicates that the content at the address of the register R3 is written in the register R4 if C0=1, or nothing is done if C0=0.

As to the latency, it is assumed that every instruction can be executed during one cycle.

The following will describe a configuration and operations of a compiler device according to the present embodiment, while referring to FIG. 1.

The present compiler device receives a source program 301 and produces an assembler code 309. The compiler device includes a general optimization unit 302, a conditional-executable-instruction generation unit 304, a scheduling unit 306, and a branch instruction insertion unit 308.

The general optimization unit 302 receives the source program 301, parses the same, converts the same into an intermediate code to be treated inside the compiler device, and applies the general optimization identical to that carried out by the conventional compiler devices, thereby producing a first intermediate code 303 whose elements correspond to instructions of the assembler code, respectively.

The conditional-executable-instruction generation unit 304 receives the first intermediate code 303, and deletes branch instructions from a part having a branch structure to convert the part into a series of conditional executable instructions that refer to conditional flags, thereby producing a second intermediate code 305. The conditional-executable-instruction generation unit 304 employs a technique for the conditional-executable-instruction generation that the conventional compiler devices carry out.

The scheduling unit 306 receives the second intermediate code 305, re-arranges the instructions and inserts parallel processing borders, thereby producing a third intermediate code 307. The scheduling unit 306 employs a scheduling technique such as the list scheduling carried out by the conventional compiler devices.

The branch instruction insertion unit 308 receives the third intermediate code 307, and in the case where there is a condition under which any instructions are not executed serially, the branch instruction insertion unit 308 inserts branch instructions that refer to the foregoing condition, thereby producing the assembler code 309.

Figure 2:
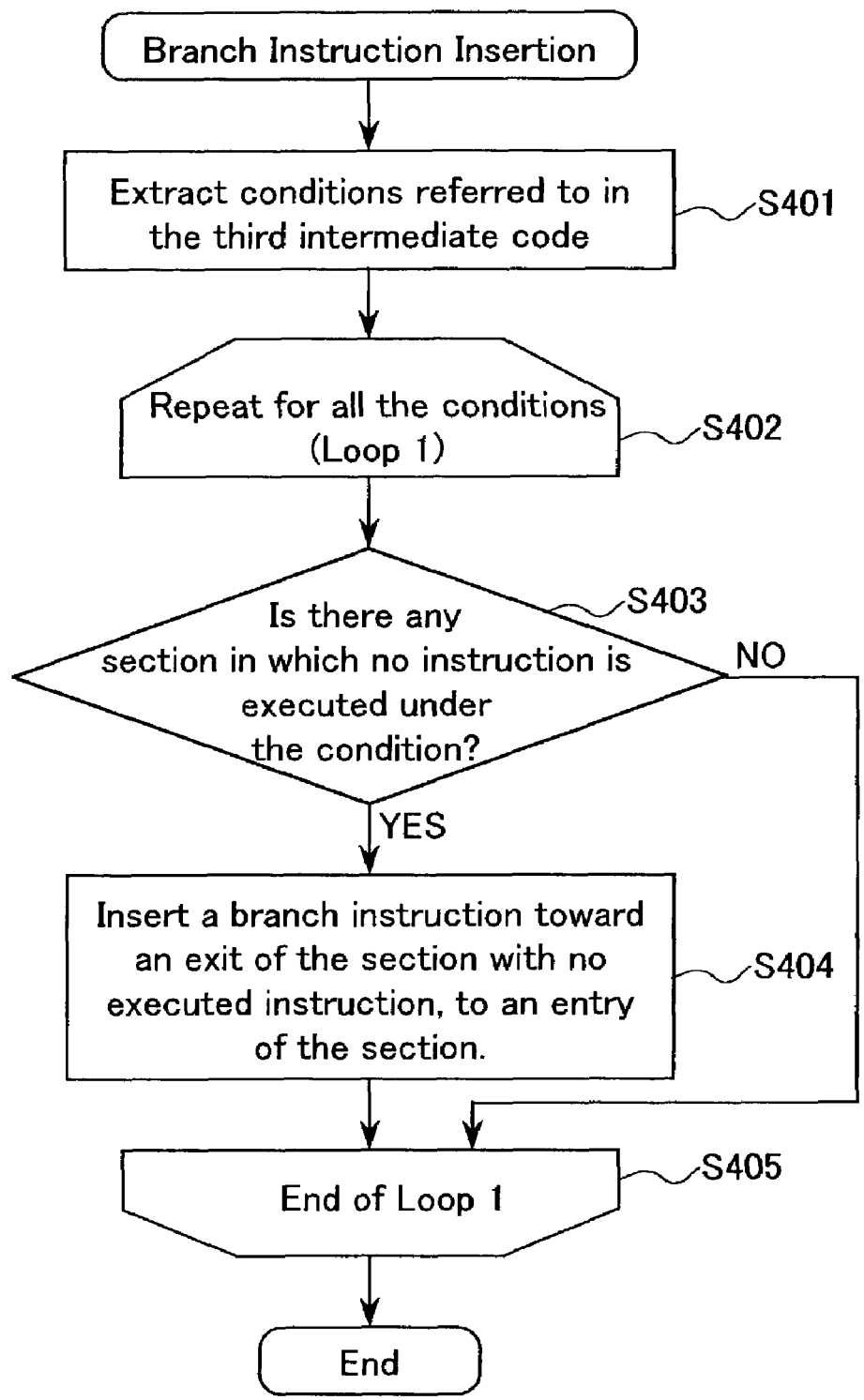
FIG. 2 is a flowchart illustrating a procedure of a branch instruction inserting operation in the foregoing compiler device.

FIG. 2 is a flowchart showing a procedure of the processing operation conducted by the branch instruction insertion unit 308. The branch instruction insertion unit 308 first extracts all the conditions referred to by the conditional executable instructions from the third intermediate code 307 supplied thereto (step S401).

Next, the branch instruction insertion unit 308 repeats the following steps S403 to S404 with respect to each of the extracted conditions (step S402).

The branch instruction insertion unit 308 checks whether there is any section in which no instruction is executed under the condition concerned (step S403).

When there is such a section in which no instruction is executed (the result of the step S403 is YES), the branch instruction insertion unit 308 inserts, into an entry cycle for the foregoing section, a conditional branch instruction to an exit cycle for the foregoing section, which refers to the condition concerned (step S404). If there is not such a section (the result of the step S403 is NO), nothing is done.

Returning to the step S402, the branch instruction insertion unit 308 repeats the foregoing steps (step S405).

Here, the following will describe operations of constituent elements peculiar to the present compiler device, referring to a concrete example of a C language program and an assembler code.

A C language program shown in FIG. 3 (identical to that shown in FIG. 29 referred to above) is shown as an example in the following description. It should be noted that though the first intermediate code 303 and the second intermediate code 305 generated midway actually have data structures owned inside by the compiler device per se and are different from the assembler code 307, their constituent elements are provided in a format of one-to-one correspondence to the instructions of the assembler code 307. Therefore, hereinafter the codes are shown in the drawings in the same format as that of the assembler code 307, and their elements are referred to as instructions.

The general optimization unit 302 receives a C language program shown in FIG. 3 as the source program 301. The general optimization unit 302 parses the program shown in FIG. 3, applies the general optimization to the same, thereby producing a code having a content shown in FIG. 4 (identical to that shown in FIG. 31 referred to above) as the first intermediate code 303. Here, conditional executable instructions are not employed, but branch instructions are employed.

Next, the conditional-executable-instruction generation unit 304 receives the code shown in FIG. 4 as the first intermediate code 303, and converts the branch structure of the instructions 501 to 508 into conditional executable instructions. More specifically, the unit changes the instruction 501, which is a compare instruction, so that the result of either true or false is written in each of flags C0 and C1 (an instruction 509 in FIG. 5). The unit also deletes the instructions 502 and 507, which are branch instructions. Furthermore, the unit converts the instructions 503 to 506 and 508 into conditional executable instructions that refer to the flags C0 and C1 (instructions 510, 512 to 514, and 511 shown in FIG. 5), respectively. Consequently, the code shown in FIG. 5 (identical to that shown in FIG. 30 referred to above) is produced as the second intermediate code 305.

The second intermediate code 305 shown in FIG. 5 determines whether the condition R5>0 is met in the execution of the instruction 509, and writes 1 and 0 in the flags C0 and C1, respectively (C0=1, C1=0), if the condition is met, or otherwise, writes 0 and 1 in the flags C0 and C1, respectively (C0=0, C1=1). The instructions 510, 512, 513, and 514 are executed when the flag C0 is 1, whereas the instruction 511 is executed when the flag C1 is 1.

Then, the scheduling unit 306 receives the code shown in FIG. 5 as the second intermediate code 305, carries out list scheduling with respect to the same, and inserts "E" indicative of the parallel processing border. Thus, a code shown in FIG. 6 is produced as the third intermediate code 307. Since the instructions 516 and 517 are conditional executable instructions that refer to different flags, they can be processed in parallel. Since the instructions 518, 519, and 520 have dependency on the data in the register R0, they cannot be processed in parallel.

Subsequently, the branch instruction insertion unit 308 receives the code shown in FIG. 6 as the third intermediate code 307. In the third intermediate code 307, two conditions, R5>0 (stored in C0) and R5≦0 (stored in C1), are referred to (step S401).

Then, the following process is carried out repeatedly by the branch instruction insertion unit 308 so as to be applied to each of the foregoing conditions (step S402).

First, checking instructions executed under the condition of R5>0 (C0=1), it is found that there is no section in which no instruction is executed, since the instructions 515, 516, 518, 519, and 520 are executed successively in each cycle (step S403).

Next, checking instructions executed under the condition of R5>0 (C1=1), it is found that only the instructions 515 and 517 are executed, and after the execution of the instruction 517, there is a section of three cycles in which no instruction is executed (step S403).

Therefore, a branch instruction toward an exit cycle for the section with no instruction execution (to a cycle next to the cycle at which the instruction 520 is executed), which refers to C1, is inserted after an entry cycle for the foregoing interval (after the cycle at which the instruction 516 or 517 is executed) (step S404).

So far the repetition of the process to be applied to all the conditions is completed (step S405), and the processing operation conducted by the branch instruction insertion unit 308 ends. Consequently, an assembler code shown in FIG. 7 is produced as the assembler code 309 (FIG. 1). As shown in FIG. 7, since a conditional branch instruction 524 toward a label L1, which refers to C1, is inserted, the processing operation stops at instructions 523 in the case where the flag C1 is true, and therefore, the unnecessary processing of the instructions 525, 526, and 527 does not occur.

Thus, the number of execute cycles under the condition of R5≦0 (C1=1) is reduced to two, and the use of the conditional executable instructions results in an improved performance, irrespective of the condition.

It should be noted that the foregoing describes a device, including the general optimization unit 302, the conditional-executable-instruction generation unit 304, the scheduling unit 306, and the branch instruction insertion unit 308, but the present invention can be implemented with a program describing the operation sequences of the respective processing units. In this case, the compiler device of the present embodiment described above can be implemented by means of a computer in the following manner: the program is stored in an arbitrary recording medium such as a CD-ROM and the computer reads the same, or the program is downloaded to the computer via communication network, and the computer runs the program.

SECOND EMBODIMENT

The following describes another embodiment according to the present invention.

The foregoing first embodiment is described referring to a compiler device that is capable of reducing the number of execute cycles in a general case where there is a sequence of instructions which no instruction is executed under a certain condition. However, a compiler device according to the present embodiment is used particularly in the case where a loop is subjected to software pipelining. It should be noted that a target processor of the present compiler device is identical to that in the first embodiment.

Figure 8:
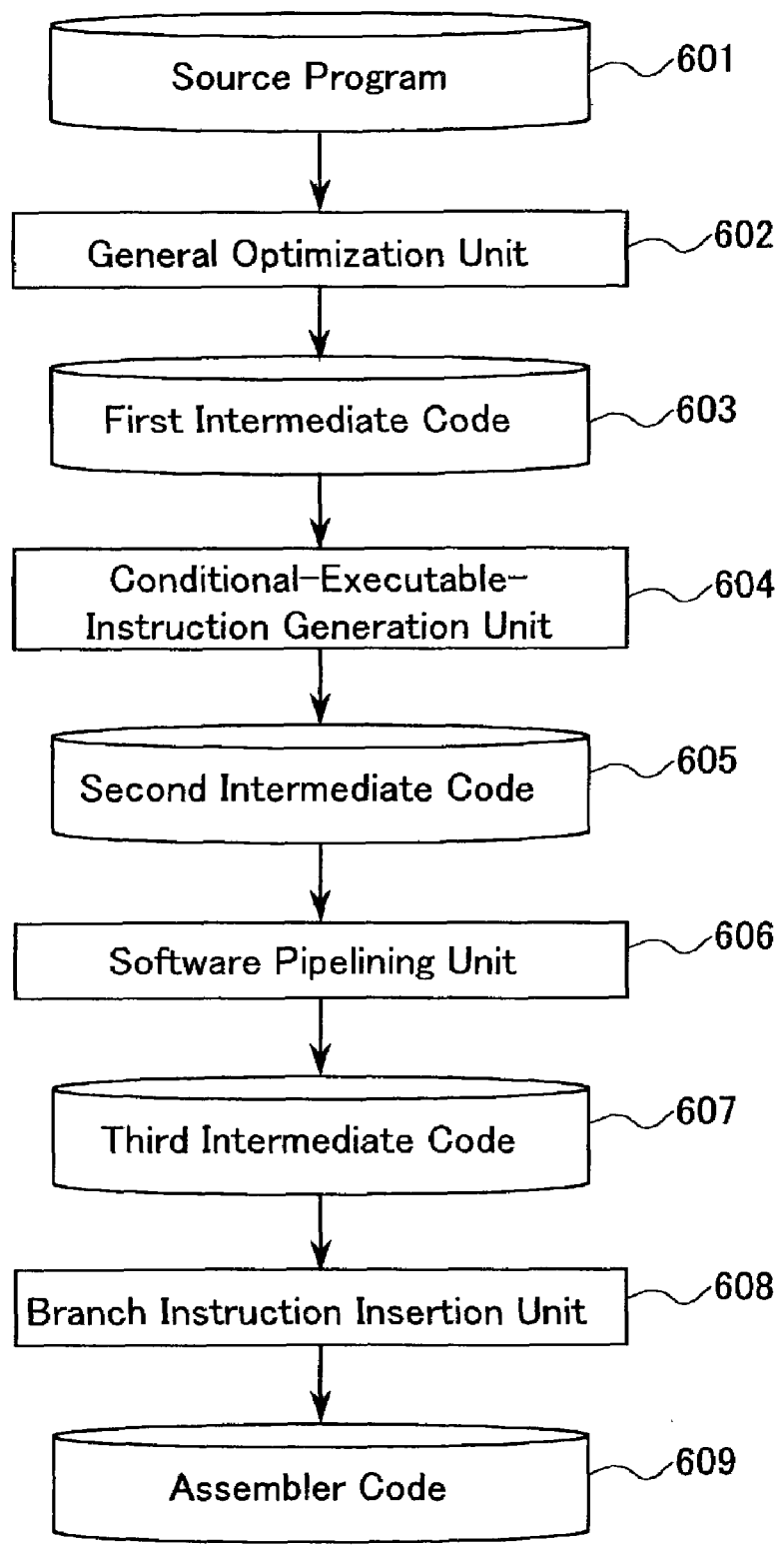
FIG. 8 is a block diagram illustrating a configuration of a compiler device according to a second embodiment of the present invention, along with input and output codes and intermediate codes.

As shown in FIG. 8, the compiler device according to the present embodiment has a configuration identical to that of the compiler device according to the first embodiment except that the former includes a software pipelining unit 606 in place of the scheduling unit 306. Descriptions of constituent portions identical to those in the compiler device according to the first embodiment are omitted, for simplifying the description. However, the operation of the branch instruction insertion unit 608 will be described later since it is different slightly from that of the branch instruction insertion unit 308 of the compiler device according to the first embodiment.

The software pipelining unit 606 receives a second intermediate code 605 and carries out the scheduling of instructions so that different iterations of loops should be overlapped each other when they are executed, that is, so-called software pipelining, as well as employs a conventional instruction scheduling technique such as the list scheduling as conducted by the scheduling unit 306, with respect to the portions other than the loops.

Figure 9:
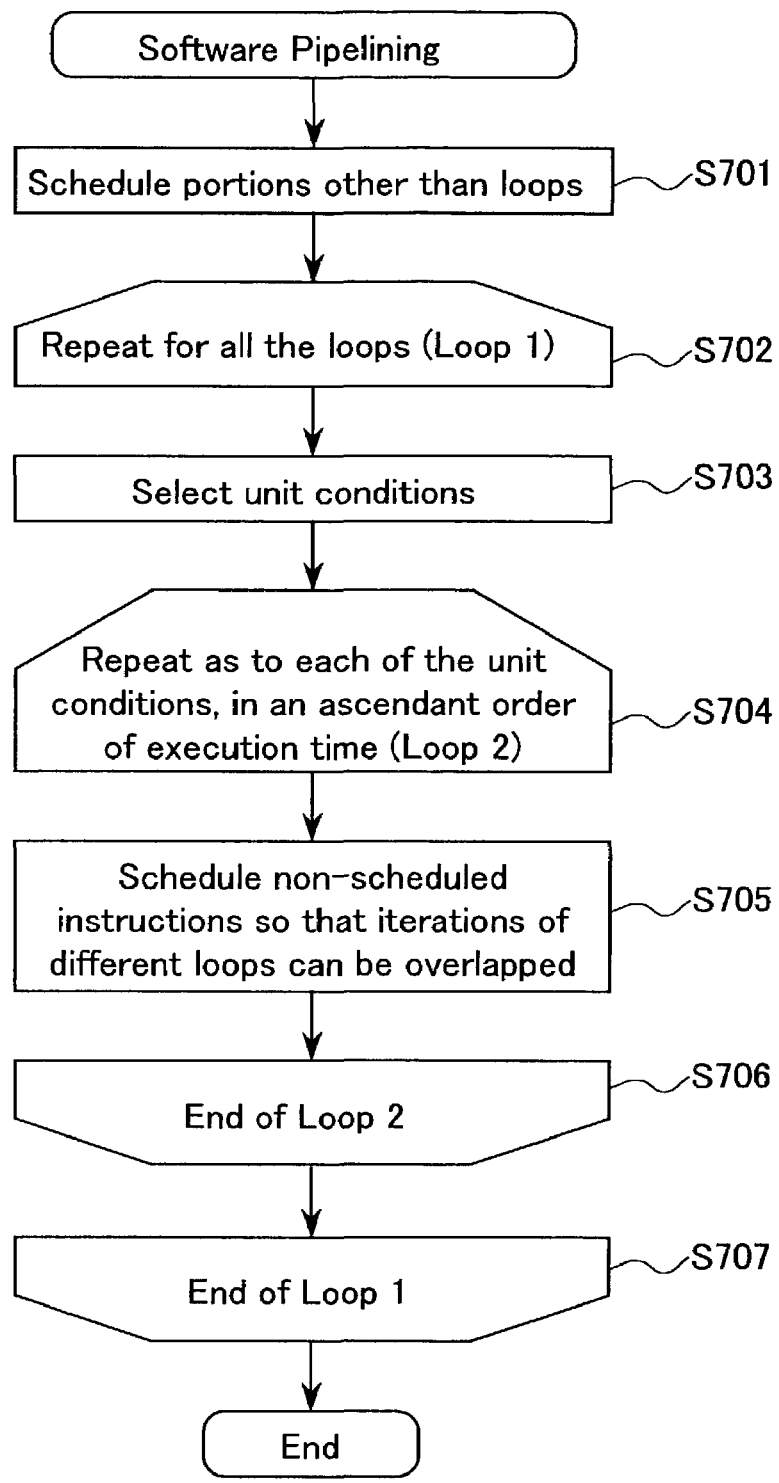
FIG. 9 is a flowchart illustrating a procedure of software pipelining in the compiler device according to the second embodiment.

FIG. 9 illustrates a procedure of the processing operation conducted by the software pipelining unit 606.

The software pipelining unit 606 carries out the scheduling of portions other than loops (step S701). This is carried out employing the conventional list scheduling technique or the like. In the case where loops are present, the following process is carried out repetitively so as to be applied to each loop structure (step S702).

First of all, among all the conditions that are referred to, unit conditions are selected that are a plurality of conditions such that a logical sum of all the conditions is true always (step S703).

As to each unit condition, only a series of instructions that are likely to be executed when the condition concerned is met are list scheduled, and by carrying out the following process repeatedly, the instructions are processed in an execution-time (critical path) increasing order.

As to instructions that have been already scheduled, their positions resulting from the scheduling remain fixed, and among the series of instructions that have not been scheduled, instructions that are likely to be executed when the condition concerned is met are scheduled so that different iterations of loops are overlapped each other when they are executed (step S705). The foregoing process is carried out repetitively so as to be applied to each of the unit conditions (step S706). Additionally, the steps S703 to S705 are repeated with respect to each of the loops (step S707).

As described above, since the operation of the branch instruction insertion unit 608 is different from that of the branch instruction insertion unit 308 of the first embodiment, the following will describe the operation of the branch instruction insertion unit.

Figure 10:
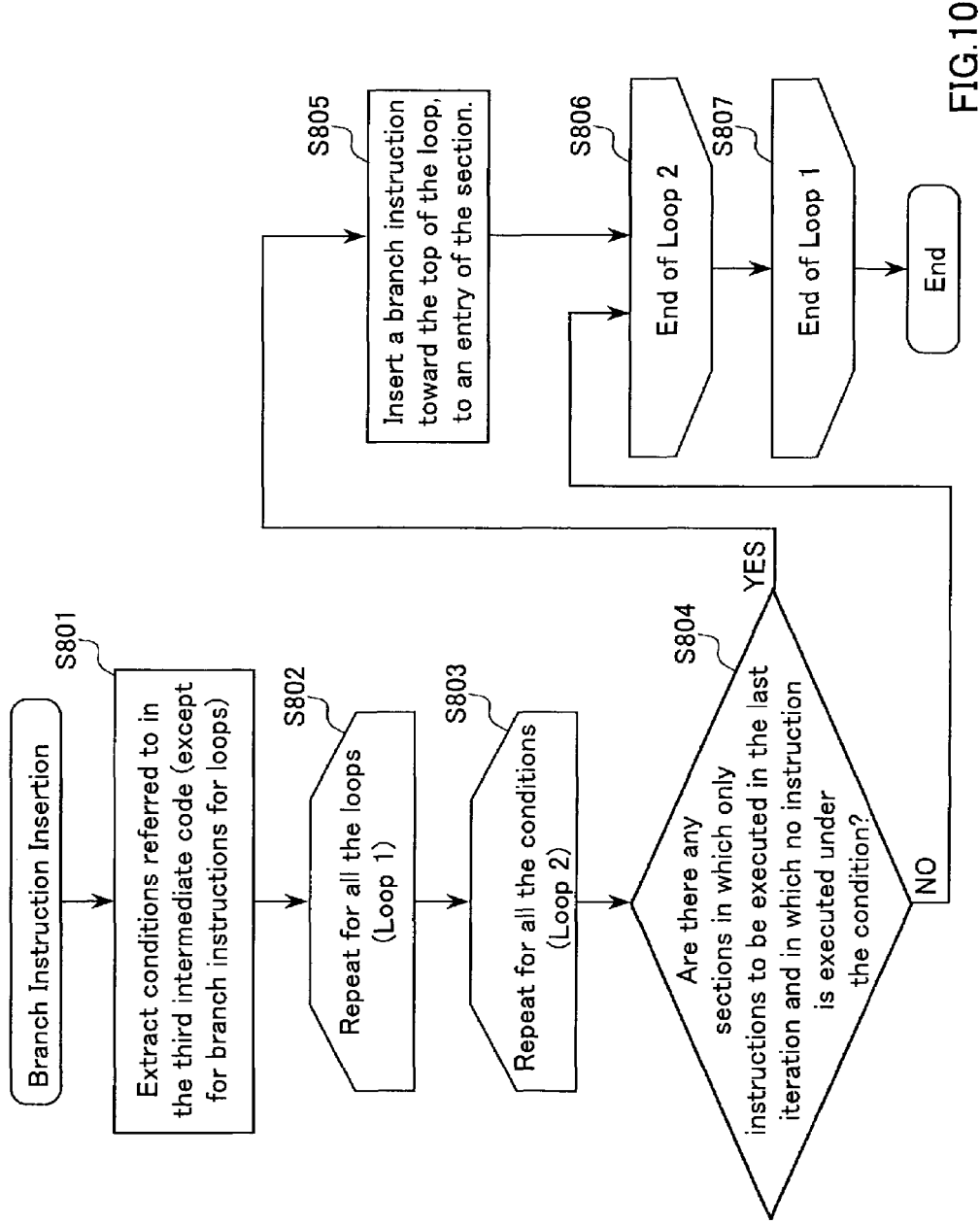
FIG. 10 is a flowchart illustrating a procedure of branch-instruction insertion in the compiler device according to the second embodiment.

FIG. 10 is a flowchart illustrating the procedure of the processing operation conducted by the branch instruction insertion unit 608. The branch instruction insertion unit 608 first extracts all the conditions that are referred to by conditional executable instructions in the third intermediate code 607 supplied thereto (step S801), except for the branch conditions of loops.

Next, a process of a loop 1 composed of steps S803 to S806 shown below is carried out repetitively so as to be applied to each of the loops of the third intermediate code 607 (step S802).

Besides, a process of a loop 2 composed of the steps S804 and S805 is carried out repetitively so as to be applied to each of the conditions extracted (step S803).

First of all, among the loops subjected to software pipelining, it is determined whether there is a section in which no instruction is present other than instructions that would be executed only in the last iteration, in which no instruction is executed under the condition concerned (except for branch instructions for the continuation of the loop), and in which instructions continue to an end of the loop (step S804).

If any, a conditional branch instruction toward to the top of the loop, which refers to the condition concerned, is inserted at an entry of the section in which no instruction is executed (step S805). If not, nothing is done.

The foregoing steps S804 and S805 are carried out repetitively for each of the conditions (step S806), and the steps S803 to S806 are carried out repetitively for each of the loops (step S807).

The following will describe the foregoing operation in more detail, referring to a concrete example of a C language program and an assembler code. Here, an example of the compilation of a C language program shown in FIG. 11 is described.

Figure 11:
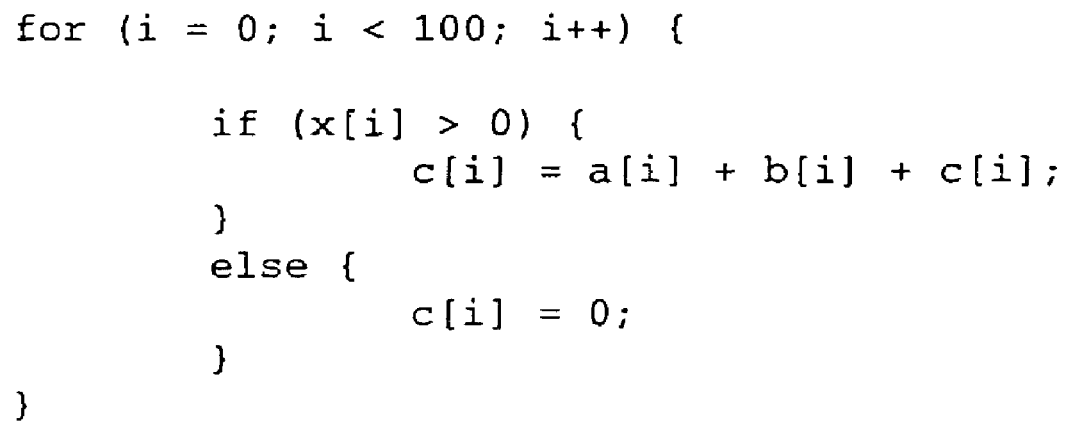

The general optimization unit 602 receives the C language program shown in FIG. 11 as a source program 601, parses the same, and applies the general optimization to the program, thereby producing code having a content shown in FIG. 12 as a first intermediate code 603.

Next, the conditional-executable-instruction generation unit 604 receives the first intermediate code 603 shown in FIG. 12, and converts the branch structure of the instructions 902 to 917 into conditional executable instructions. More specifically, the unit changes the instruction 902, which is a compare instruction, so that the result of either a true or a false condition is written in each of flags C0 and C1 (an instruction 919 in FIG. 13). The unit also deletes the branch instructions 903 and 909. Furthermore, the unit converts the instructions 904 to 908 and 910 into conditional executable instructions that refer to the flags C0 and C1 (instructions 920 to 925), respectively. Consequently, a code having a content shown in FIG. 13 is produced as a second intermediate code 605.

The software pipelining unit 606 receives the second intermediate code 605 shown in FIG. 13, applies software pipelining to the loop structure of the instructions 918 to 932, and inserts parallel processing borders, thereby producing a third intermediate code 607. This process will be described in detail below.

First of all, portions other than loops are scheduled. However, the entirety of the second intermediate code 605 shown in FIG. 13 is in a loop structure, and therefore, there is no portion that is not included in a loop. Accordingly, nothing is done, and the flow proceeds to the next step (step S701).

Next, the second intermediate code 605 shown in FIG. 13 includes only one loop, to which the following process is applied (step S702). First, conditions of R20>0 (stored in C0) and R20≦0 (stored in C1) are selected as unit conditions (step S703).

Regarding each of the unit conditions, the series of instructions that are likely to be executed under the condition of R20>0 (C0) are the instructions 918 to 924 and 926 to 931, except for the branch instructions. The series of instructions that are likely to be executed under the condition of R20≦0 (C1) are the instructions 918, 919, and 925 to 931. In the case where these instructions are list scheduled, since the instructions 920 to 924 have dependency on the data, the execution time definitely is shorter when the instruction 925 is executed, which means that the execution time is shorter when the instructions to be executed under the condition of R20≦0 (C1) are executed. Accordingly, the procedure first focuses on the condition of R20≦0 (C1) (step S704).

The series of instructions that are likely to be executed under the condition of R20≦0 (C1) are the instructions 918, 919, and 925 to 931, and only the series of instructions are scheduled so that different iterations of loops are overlapped each other when they are executed, whereby a code as shown in FIG. 14 is obtained (step S705). A start interval indicative of the number of cycles for the execution of each iteration is three. Normally, a code resulting from software pipelining is composed of three divisions of prologue, kernel, and epilogue, but in this example only the kernel is shown. In the description below as well, regarding a code resulting from software pipelining, only a kernel thereof is shown. Furthermore, the numeral attached at the end of each instruction, separated therefrom with a semicolon interposed therebetween, in FIG. 14 and other drawings is indicative of a relative position in the iteration execution order of the iteration in which of the instruction is executed. For instance, the instruction 933 in FIG. 14 is an instruction to be executed one iteration before the execution of the instruction 935.

Next, the procedure focuses on the condition C20<0 (C0). The instructions 920 to 924 are scheduled, with the data dependency on the already scheduled instructions taken into consideration, whereby a code as shown in FIG. 15 is obtained. It should be noted that the start interval of this code is five (step S705). Thus, the loops end (steps S706 and S707), and a third intermediate code 607 as shown in FIG. 15 is produced.

Next, the branch instruction insertion unit 608 receives the third intermediate code 607 shown in FIG. 15, to execute the branch instruction inserting operation. First, conditions referred to in the third intermediate code 607 shown in FIG. 15 are two conditions, R20>0 (stored in C0) and R20≦0 (stored in C1), except for branch instructions for loops (step S801). Since only one loop is present, the following process is carried out with respect to the loop (step S802).

The process of steps S804 and S805 is carried out repetitively, for each of the foregoing two conditions (step S803).

First, it is checked whether, under the condition of F20>0 (C0), there is a section in which only instructions are present that are executed only in the last iteration (iteration whose relative position in the execution order is indicated as "2"), in which no instruction is executed under the condition concerned, and which continues to an end of the loop. Since all the cycles involve the execution of instructions, such an interval is not present (step S804).

Next, it is checked whether an identical interval is present under the condition R20≦0 (C1). The instructions 953 to 956 are to be executed in the last iteration, and are present in a section in which all the instructions remain unexecuted continuously until the end of the loop (step S804). It should be noted that here, the instruction 956, which is a branch instruction for the continuation of the loop, is not taken into consideration.

Then, a branch instruction toward the top of the loop, which refers to a logical product of C1 and a loop continuation condition C2, is inserted in an entry cycle for the foregoing interval (step S805).

So far, the process repetitively carried out is completed with respect to all the conditions (step S806), and since there is only one loop, the process is completed with respect to the loop (step S807). Consequently, a code shown in FIG. 16 is produced as an assembler code 609.

As shown in FIG. 16, since the conditional branch instruction 968 for branching to the top of the loop, which refers to a logical product of C1 and C2, is inserted, when the flag C1 is set to be true, the process of the loop ends with the three initial cycles, and the flow returns to the top of the loop without executing the instructions 969 to 971 that refer to C0.

This results in that the execution of one iteration, which conventionally required five cycles under any condition, now requires only three cycles under the condition of $R20 \leq 0$ (C1) exclusively. In other words, it is possible to eliminate the possibility of deteriorating the performance even if the software pipelining by the conditional execution is carried out.

It should be noted that it is possible to apply the software pipelining to the paths in a descendent order of the path establishment frequency, so that a path with a higher execution frequency is given priority in scheduling resulting in a smaller number of execute cycles. A detailed operation of the software pipelining unit 608 in the foregoing case is shown in FIG. 17.

Figure 17:
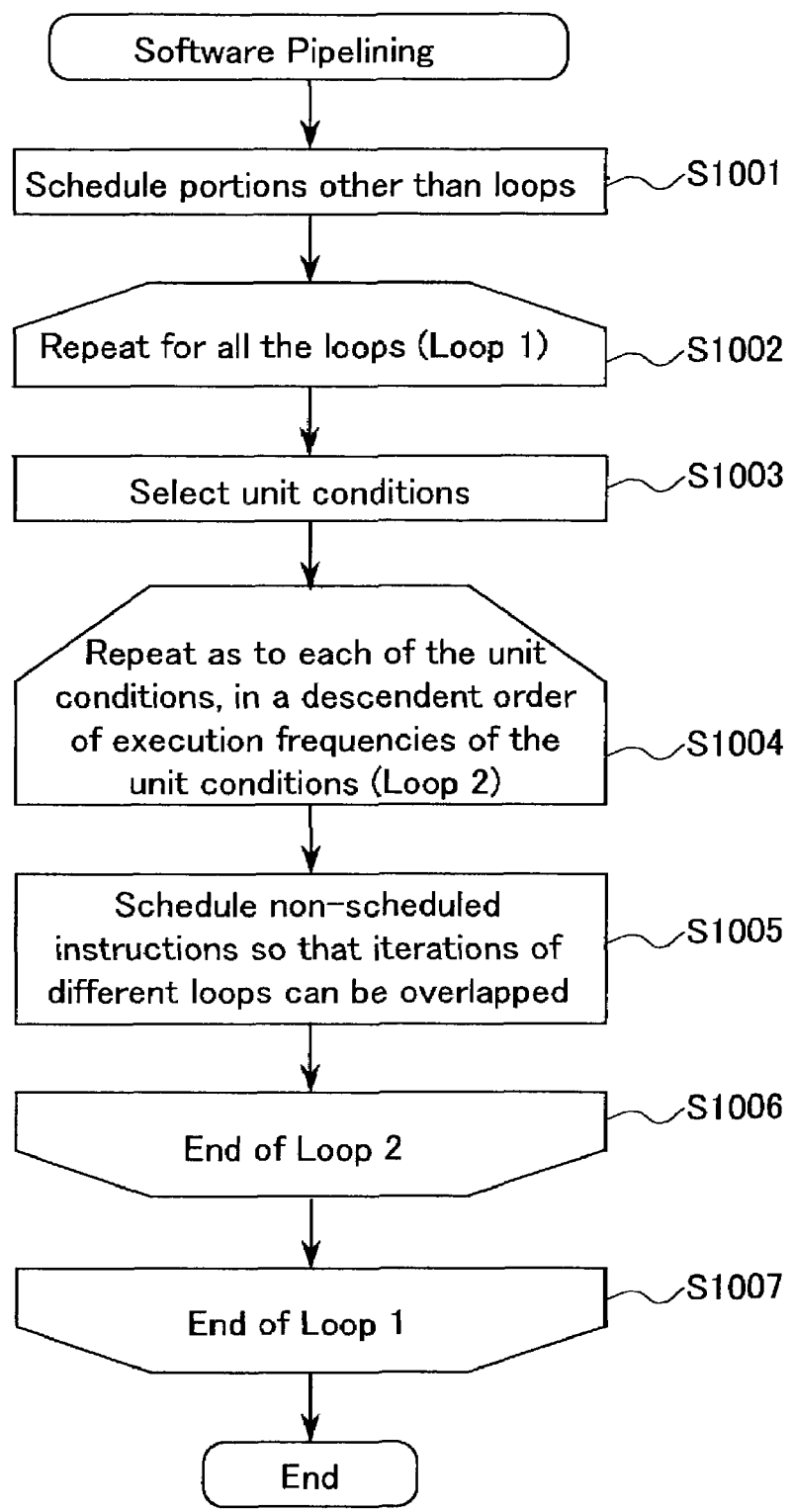
FIG. 17 is a flowchart illustrating a modified example of the software pipelining performed by the compiler device of the second embodiment.

Comparing the process shown in FIG. 17 with the process shown in FIG. 9, it can be seen that the former has a different unit-condition-selecting order in which the process is carried out repetitively as to each of the unit conditions. More specifically, the step S704 in FIG. 9 and a step S1004 in FIG. 17 are different.

In the case of FIG. 17, the operation (step S1005) corresponding to the step S705 in FIG. 9 is carried out repetitively so that the unit conditions are processed in a frequency descending order based on respective frequencies at which the unit conditions are satisfied (step S1004). In other words, by collecting execution histories beforehand, the process is carried out according to the respective establishment frequencies of the conditions.

By performing the foregoing processing operation, it is possible to prevent the performance degradation caused by software pipelining, and to obtain the maximum effect of the software pipelining, even with respect to a loop with biased execution frequencies.

It should be noted that the foregoing describes a device including the general optimization unit 602, the conditional-executable-instruction generation unit 604, the software pipelining unit 606, and the branch instruction insertion unit 608, but the present invention may be implemented with a program describing the operation sequences of the respective processing units. In this case, the compiler device of the present embodiment described above can be implemented using a computer in the following manner: the program is stored in an arbitrary recording medium such as a CD-ROM and the computer reads the program, or the program is downloaded to the computer via communication network, so that the computer may run the program.

THIRD EMBODIMENT

The following will describe still another embodiment according to the present invention.

A target processor of the compiler device according to the present embodiment is similar to the target processor of the compiler device according to the first and second embodiments, except for the number of instructions that may be processed in parallel. This latter condition is described below.

In the case where conditional executable instructions are employed, conditional executable instructions that refer to the foregoing condition are cancelled when a certain condition is not met, thereby wasting resources such as arithmetic units and decoders. Therefore, the target processor of the compiler device according to the present embodiment is organized so that if the number of instructions that are not actually cancelled but processed in parallel does not exceed four, more instructions are allowed to be present in the cycle.

More specifically, the scheduling as shown in FIG. 18 is allowed. C0 and C1 are exclusive conditions that are set by the compare instruction 1101. In the next cycle, though eight instructions 1102 to 1109 are described, only four instructions, either the instructions 1102 to 1105 or the instructions 1106 to 1109 are executed according to the condition.

Furthermore, the target processor copies the values of the conditional flags C0 and C1 to C0' and C1', respectively, upon the execution of a branch instruction that controls the loop. This instruction is expressed as lbr in mnemonic form. This makes it possible to store the result of conditional comparison in a certain iteration, which is significantly effective for software pipelining.

The structure of the compiler device is identical to that shown in FIG. 8 in conjunction with the second embodiment. It should be noted the detailed operations of the software pipelining unit 606 and the branch instruction insertion unit 608 of the same are different from those of the second embodiment.

Figure 19:
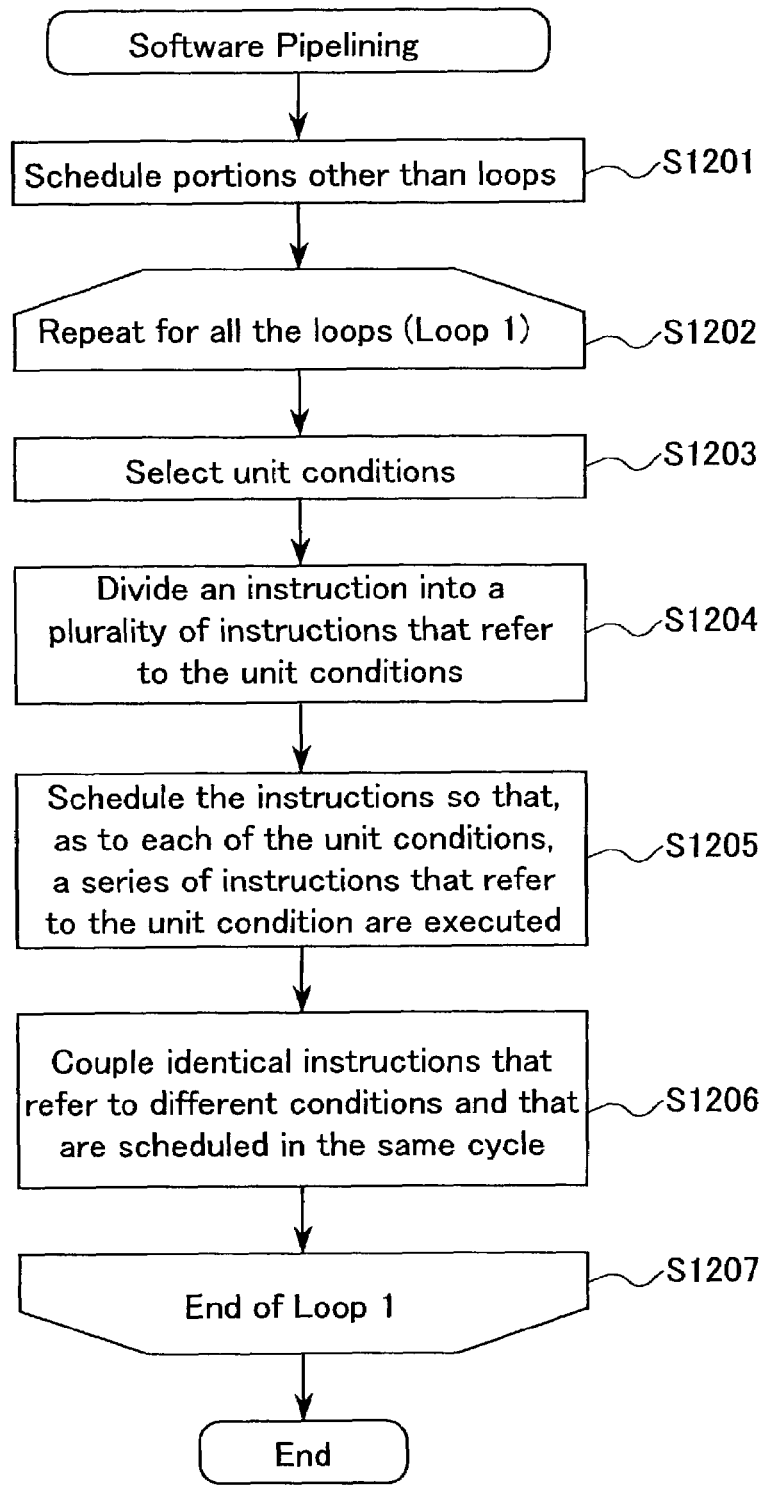
FIG. 19 is a flowchart illustrating a procedure of software pipelining performed by the compiler device of the third embodiment.

FIG. 19 illustrates a procedure of the processing operation performed by the software pipelining unit 606 according to the present embodiment. Portions other than loops are scheduled by a conventional technique (step S1201). The following process is carried out repetitively and is applied to each loop (step S1202).

First, among all the conditions referred to, unit conditions are selected that are a plurality of conditions such that a logical sum of all the conditions is true always (step S1203). Next, an instruction that refers to a logical sum of a plurality of unit conditions as its condition is divided into a plurality of instructions that refer to each unit condition (step S1204). Then, the instructions are scheduled so that, as to each of the unit conditions, a set of instructions that refer to the unit condition are executed so that different iterations of loops are overlapped (step S1205). In the case where identical instructions referring to different conditions are scheduled in the same cycle, these instructions are coupled into an instruction that refers to a logical sum of the foregoing different conditions (step S1206). The process of the foregoing steps S1203 to S1206 is repeated and is applied to each loop (step S1207).

Figure 20:
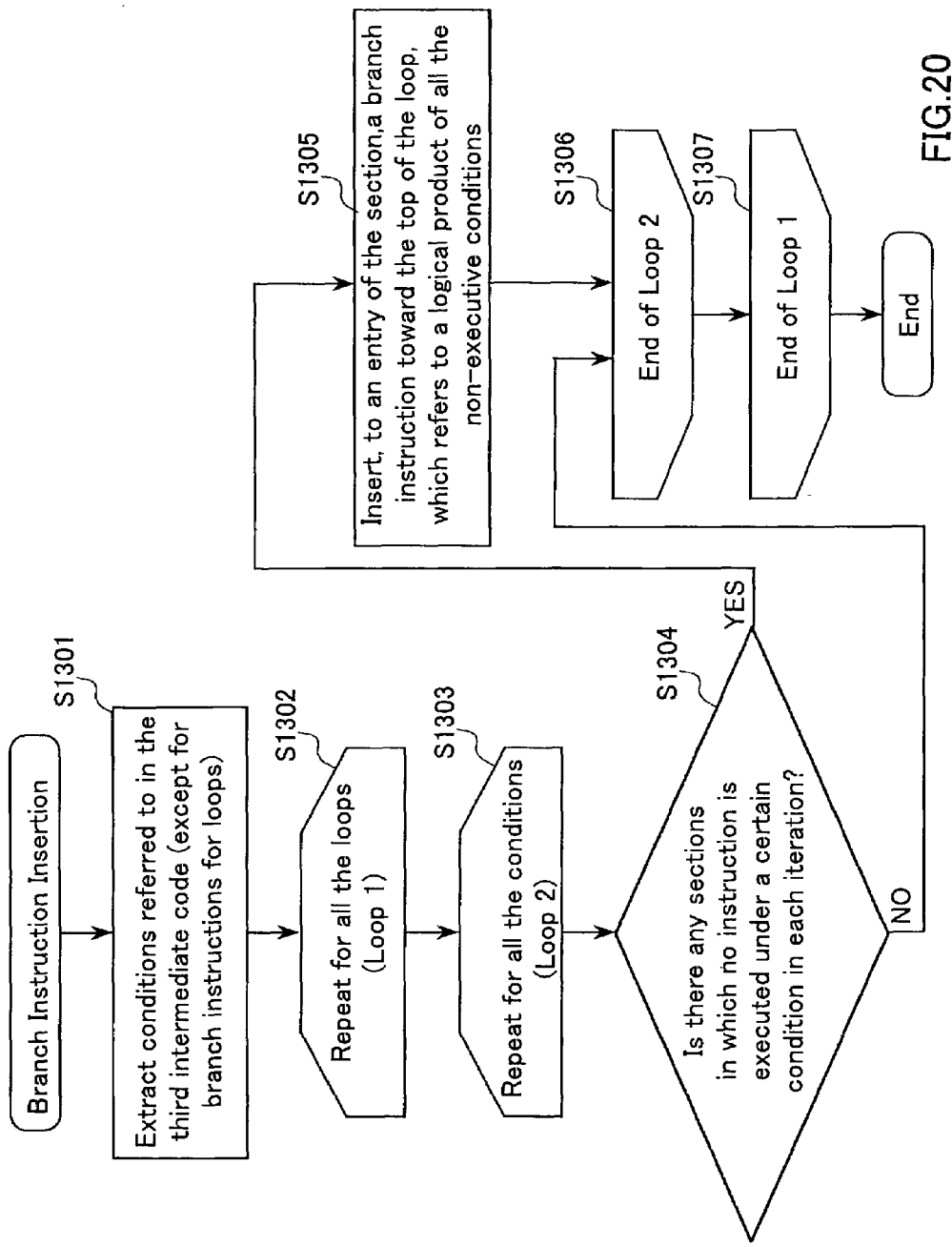
FIG. 20 is a flowchart illustrating a procedure of a branch-instruction inserting operation performed by the compiler device of the third embodiment.

Next, the following will describe an operation of the branch instruction insertion unit 608 of the present embodiment, while referring to a flowchart of FIG. 20. Comparing FIG. 20 with FIG. 10, it can be seen that the operation of the branch instruction insertion unit 608 of the present embodiment is different from that of the second embodiment in the process (steps S1304 and S1305) of an internal loop (loop 2) of a double loop.

For each condition, it is determined whether a non-executive condition where no instruction is executed is present or not in each iteration, and whether there is a section where the non-executive conditions are present in all the iterations and that continues to the end of the loop (step S1304). If there is any such non-executive condition, a conditional branch instruction toward the top of the loop, which refers to a logical product of all the non-executive conditions as a condition, is inserted (step S1305). If not, nothing is done.

The following will describe the foregoing operation in more detail, referring to concrete examples of a C language program and an assembler code. Here, the description is made employing a C language program shown in FIG. 21 as an example.

The general optimization unit 602 and the conditional-executable-instruction generation unit 604 carry out identical processes as those according to the second embodiment, and consequently produce a second intermediate code 605 shown in FIG. 22.

The software pipelining unit 606 receives the second intermediate code 605 shown in FIG. 22 and carries out software pipelining. In the second intermediate code 605 shown in FIG. 22, there is no portion that is not included in a loop (step S1201), and only one loop is present (step S1202). Therefore, R20>0 (stored in C0) and R20≦0 (stored in C1) are selected as unit conditions (step S1203).

Next, among the instructions that refer to a plurality of conditions as logical sums, each of instructions that depend directly or indirectly on the conditions is divided into plural instructions that refer to the unit conditions (flags C0 and C1), respectively (step S1204). For instance, instructions 1301, 1304, and 1309 shown in FIG. 22 do not depend on a conditional compare instruction 1302 and hence they are not to be divided, whereas instructions 1303 and 1305 to 1308 are to be divided. The "division" is exemplified by, for example, an operation of generating an instruction 1401 that refers to the flag C0 and an instruction 1404 that refers to the flag C1 as shown in FIG. 23 from the instruction 1303 shown in FIG. 22. Besides, the instructions 1305 to 1308 in FIG. 22 are divided into four instructions presented between an instruction 1402 to an instruction 1403 both inclusive and four instructions presented between an instruction 1405 to an instruction 1406 both inclusive in FIG. 23.

Then, as to each unit condition, a set of instructions that refer to the unit condition concerned are scheduled so that different iterations of loops can be overlapped when they are executed (step S1205). The instructions that refer to the condition of R20>0 (C0) are scheduled, and a code as shown in FIG. 24 is obtained, with a start interval of 5. In FIG. 24, C0 and C0' are referred to in two parallel iterations, respectively.

The instructions that refer to the condition of R20≦0 (C1) are also scheduled, and a code shown in FIG. 25 is obtained, with a start interval of 3. Here, since lbr branch instructions 1420 and 1421 are employed, the values of the flags C0 and C1 are transferred to the flags C0 and C1', respectively, when the branch instructions are executed. In FIG. 25, C1 and C1' are referred to in two parallel iterations, respectively.

Next, the series of instructions in FIG. 24 and the series of instructions in FIG. 25 are combined. Furthermore, the instruction 1408 in FIG. 24 and the instruction 1409 in FIG. 25 are identical instructions that refer to C0 and C1, respectively, and that are placed within the same cycle. Therefore, these two instructions are coupled. As a result, the series of instructions as shown in FIG. 26 are obtained (step S1206). An instruction 1410 shown in FIG. 26 results from the coupling of the instructions 1408 and 1409.

Since there is only one loop, the process ends here (step S1207), and a code with a content shown in FIG. 26 is produced as a third intermediate code 607.

Next, the branch instruction insertion unit 608 receives a third intermediate code 607 shown in FIG. 26, and inserts branch instructions therein. First, conditions referred to in the third intermediate code 607 shown in FIG. 26 are R20>0 (C0) and R20≦ (C1) (step S1301). Since there is only one loop, the following process is applied to the loop (step S1302).

The following process of the steps S1304 to S1305 is carried out repetitively, as to each of the foregoing two conditions.

Under R20>0 (C0), there is no section in which no instruction is executed (step S1304). In contrast, regarding R20≦0 (C1), a section from an instruction 1411 to an instruction 1412 both inclusive is a section in which, when this condition is satisfied, no instruction is executed (step S1304). Therefore, a conditional branch instruction 1413 (see FIG. 27) that refers to a logical product of the flags C1 and C1' is inserted into an entry cycle for the foregoing section (step S1305).

Thus, the process of the loop 2 is completed with respect to all the conditions (step S1306), and since there is only one loop, the process for the loop 1 also ends here (step S1307). Consequently, a code shown in FIG. 27 is produced as an assembler code 609. As shown in FIG. 27, since the conditional branch instruction 1413 is inserted, which refers to a logical product of C1, C1', and C2 and that instructs to branch to the top of the loop, the process of the loop is stopped after three initial cycles in the case where the flags C1 and C1' both are established. Accordingly, the flow returns to the top of the loop, without executing the instructions presented from the instruction 1414 to the instruction 1416 both inclusive, which refer to C0 or C0'.

As a result of the foregoing process, the execution of one iteration, which conventionally required five cycles under any condition, now requires only three cycles in the case where iterations in which the condition of R20≦0. (C1) is met continue successively. This makes it possible to eliminate the possibility of degrading the performance even if software pipelining by conditional execution is carried out.

It should be noted that the foregoing describes the present embodiment assuming a case where a VLIW processor is a target processor, but the same method can be used with respect to the superscalar architecture to produce a significant effect.

Furthermore, in the foregoing description, the latency of an instruction is assumed to be one cycle, but even in the case where an instruction having a latency of a plurality of cycles is present, the present invention can be applied by taking the presence of such an instruction into consideration when scheduling or software pipelining is performed.

It should be noted that the foregoing describes a device including the general optimization unit 602, the conditional-executable-instruction generation unit 604, the software pipelining unit 606, and the branch instruction insertion unit 608, but the present invention can be implemented with a program describing the operation sequences of the respective processing units. In this case, the compiler device of the present embodiment described above can be implemented by means of a computer in the following manner: the program is stored in an arbitrary recording medium such as a CD-ROM and the computer reads the program, or the program is downloaded to the computer via communication network, so that the computer runs the program.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A compiling device comprising:
   a conditional-executable-instructing generating unit for generating a conditional executable instruction, being executed when a condition that the conditional executable instruction refers to is satisfied, and not being executed when the condition that the conditional executable instruction refers to is not satisfied;
   a scheduling unit for scheduling a plurality of conditional executable instructions so that the plurality of conditional executable instructions are processed in parallel; and
   a branch instruction inserting unit, wherein in a case where there is a section containing a non-executive condition under which no instruction is executed in one cycle or a plurality of cycles in series, the branch instruction inserting unit inserts a conditional branch instruction to after an instruction of a cycle immediately before a start of the section, the branch instruction referring to the non-executive condition and instructing to branch to a cycle immediately after a last cycle of the section.

2. The compiling device according to claim 1, further comprising a software pipelining unit for scheduling instructions so that different iterations of loops are overlapped when they are executed,
   wherein, in the case where there is a section in which no instruction is present other than instructions that are to be executed only in a last iteration, which contains a non-executive condition under which no instruction is executed, and which continues in one cycle or a plurality of cycles in series to an end of a loop, the branch-instruction inserting unit inserts a conditional branch instruction into a cycle immediately before a start of the section, the conditional branch instruction referring to the non-executive condition and instructing to branch to a cycle at a top of the loop.

3. The compiling device according to claim 2, wherein, in the case where any non-executive condition under which no instruction is executed is present in each iteration and there is a section in which the non-executive conditions are present in all the iterations and which continues in one cycle or a plurality of cycles in series to an end of a loop, the branch instruction inserting unit inserts a conditional branch instruction into a cycle immediately before a start of the section, the conditional branch instruction referring to a logical product of the non-executive conditions of each iteration and instructing to branch to a cycle at a top of the loop.

4. The compiling device according to claim 2 or 3, wherein the software pipelining unit:
   selects unit conditions that are a plurality of conditions such that a logical sum of all the conditions is true always,
   divides each of instructions that are executed referring to a logical sum of a plurality of, or all of, the unit conditions into a plurality of conditional executable instructions that refer to the unit conditions,
   schedules, as to each of the unit conditions, instructions that refer to the unit condition so that different iterations of loops are overlapped when they are executed, and
   combines a series of instructions that have been scheduled as to each of the unit conditions.

5. The compiling device according to claim 4, wherein
   the software pipelining unit selects unit conditions that are a plurality of conditions such that a logical sum of all the conditions is true always, and
   as to each of the unit conditions, in an ascendant order of execution times for unit conditions, the execution time being a time required for executing conditional instructions that are a series of instructions that refer to either the unit condition or a condition containing the unit condition, the software pipelining unit schedules the conditional instructions, with scheduled positions of already-scheduled instructions being fixed, so that different iterations of loops are overlapped when they are executed.

6. The compiling device according to claim 2, wherein
   the software pipelining unit selects unit conditions that are a plurality of conditions such that a logical sum of all the conditions is true always, and
   as to each of the unit conditions, in a descendent order of execution frequencies of the unit conditions, the software pipelining unit schedules conditional instructions that are a series of instructions that refer to either the unit condition or a condition containing the unit condition, with scheduled positions of already-scheduled instructions being fixed, so that different iterations of loops are overlapped when they are executed.

7. A compiling program loaded in a computer and causing the computer to execute a computer implemented method, the method comprising:
   generating a conditional executable instruction which is executed when a condition that the conditional executable instruction refers to is satisfied, and which is not executed when the condition that the conditional executable instruction refers to is not satisfied;
   scheduling a plurality of conditional executable instructions so that the plurality of conditional executable instructions are processed in parallel; and
   in the case where there is a section containing a non-executive condition under which no condition executable instruction is executed in one cycle or a plurality of cycles in series, inserting a conditional branch instruction to after an instruction of a cycle immediately before a start of the section, the branch instruction referring to the non-executive condition and instructing to branch to a cycle immediately after a last cycle of the section.

8. The compiling program according to claim 7, causing the computer to further execute:
   scheduling instructions so that different iterations of loops are overlapped when they are executed,
   wherein, in the case where there is a section in which no instruction is present other than instructions that are to be executed only in a last iteration, which contains a non-executive condition under which no instruction is executed, and which continues in
   one cycle or a plurality of cycles in series to an end of a loop, a conditional branch instruction is inserted into a cycle immediately before the start of the section, the conditional branch instruction referring to the non-executive condition and instructing to branch to a cycle at a top of the loop.

9. The compiling program according to claim 8, wherein, in the case where any non-executive condition under which no instruction is executed is present in each iteration and there is a section in which the non-executive conditions are present in all the iterations and which continues in one cycle or a plurality of cycles in series to an end of a loop, a conditional branch instruction is inserted into a cycle immediately before the start of the section, the conditional branch instruction referring to a logical product of the non-executive conditions of each iteration and instructing to branch to a cycle at a top of the loop.

10. The compiling program according to claim 8, wherein,
unit conditions are selected that are a plurality of conditions such that a logical sum of all the conditions is true always,
each of instructions that are executed referring to a logical sum of a plurality of, or all of, the unit conditions is divided into a plurality of conditional executable instructions that refer to the unit conditions,
as to each of the unit conditions, instructions that refer to the unit condition are scheduled so that different iterations of loops are overlapped when they are executed, and
a series of instructions that have been scheduled are combined as to each of the unit conditions.

11. The compiling program according to claim 10, wherein,
unit conditions are selected that are a plurality of conditions such that a logical sum of all the conditions is true always, and
as to each of the unit conditions, in an ascendant order of execution times for unit conditions, the execution time being a time required for executing conditional instructions that are a series of instructions that refer to either the unit condition or a condition containing the unit condition, the conditional instructions are scheduled with scheduled positions of already-scheduled instructions being fixed, so that different iterations of loops are overlapped when they are executed.

12. The compiling program according to claim 8, wherein,
unit conditions are selected that are a plurality of conditions such that a logical sum of all the conditions is true always, and
as to each of the unit conditions, in a descendent order of execution frequencies of the unit conditions, conditional instructions that are a series of instructions that refer to either the unit condition or a condition containing the unit condition are scheduled with scheduled positions of already-scheduled instructions being fixed, so that different iterations of loops are overlapped when they are executed.

13. The compiling device according to claim 3, wherein the software pipelining unit:
selects unit conditions that are a plurality of conditions such that a logical sum of all the conditions is true always,
divides each of instructions that are executed referring to a logical sum of a plurality of, or all of, the unit conditions into a plurality of conditional executable instructions that refer to the unit conditions,
schedules, as to each of the unit conditions, instructions that refer to the unit condition so that different iterations of loops are overlapped when they are executed, and
combines a series of instructions that have been scheduled as to each of the unit conditions.

* * * * *